US012309670B1

(12) United States Patent
Huang et al.

(10) Patent No.: US 12,309,670 B1
(45) Date of Patent: May 20, 2025

(54) BEIDOU SHORT MESSAGE COMMUNICATION METHOD AND SYSTEM FOR LOW-POWER USER TERMINAL

(71) Applicant: NATIONAL UNIVERSITY OF DEFENSE TECHNOLOGY, Changsha (CN)

(72) Inventors: Xinming Huang, Changsha (CN); Jingyuan Li, Changsha (CN); Feixue Wang, Changsha (CN); Gang Ou, Changsha (CN); Guangfu Sun, Changsha (CN); Pengcheng Zhang, Changsha (CN); Zengjun Liu, Changsha (CN); Ke Zhang, Changsha (CN); Lei Chen, Changsha (CN); Rong Zhou, Changsha (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/947,783

(22) Filed: Nov. 14, 2024

(30) Foreign Application Priority Data

Nov. 17, 2023 (CN) .......................... 202311532875.1

(51) Int. Cl.
*H04W 4/14* (2009.01)
*H04W 72/044* (2023.01)

(52) U.S. Cl.
CPC ........... *H04W 4/14* (2013.01); *H04W 72/044* (2013.01)

(58) Field of Classification Search
CPC ... H04W 84/06; H04W 12/63; H04W 36/085; H04W 4/14; H04W 48/10; H04W 84/005; H04W 72/044; H04B 7/18513
See application file for complete search history.

(56) References Cited

U.S. PATENT DOCUMENTS 6,424,831 B1 * 7/2002 Schiff ............... H04B 7/18567
455/433
2016/0286583 A1 9/2016 He et al.
(Continued)

FOREIGN PATENT DOCUMENTS

CN 109075853 A * 12/2018 ........... H04B 7/1851
CN 110191441 A * 8/2019 .............. H04W 4/70
(Continued)

OTHER PUBLICATIONS

Chen Liu-Cheng et al., "A Design on Information Processing System to Improve the Integrity and Usability of RDSS," Progress in Astronomy, Date of issue: Nov. 15, 2017, No. 04., pp. 462-472 doi: 10.3969/j.issn.1000-8349.2017.04.06 Full text Claims involved: 1-10.
(Continued)

*Primary Examiner* — Dung Hong
(74) *Attorney, Agent, or Firm* — Pilloff Passino & Cosenza LLP; Rachel K. Pilloff; Sean A. Passino

(57) ABSTRACT

A Beidou short message communication method and a system for a low-power user terminal are provided. The method includes following steps: by a user terminal, receiving outbound signals broadcast by a central station and forwarded by a satellite transponder, and constructing a short message access frame with a fixed length for transmission; by the central station, receiving and parsing the short message access frame, so as to realize the allocation of time-frequency resource blocks and transmit the time-frequency resource blocks to the user terminal; by the user terminal, transmitting a short message communication frame with a fixed format to the central station; by a communication receiving device of the central station, receiving and sequentially carrying out sampling preprocessing, anti-interference processing, rapid capture and tracking demodulation on the short message communication frame to obtain
(Continued)

communication service information, and pushing receipt information to the user terminal to complete an information push.

10 Claims, 12 Drawing Sheets

(56) References Cited

U.S. PATENT DOCUMENTS

| | | | | |
|---|---|---|---|---|
| 2021/0243713 A1* | 8/2021 | Ellenbeck | ............ | H04W 56/002 |
| 2022/0038151 A1* | 2/2022 | Sengupta | ............. | H04B 7/0695 |
| 2022/0322459 A1* | 10/2022 | Zhou | ..................... | H04W 72/21 |
| 2023/0078666 A1 | 3/2023 | Raffegeau et al. | | |
| 2024/0314664 A1* | 9/2024 | Sharma | ................ | H04W 36/08 |
| 2024/0348324 A1 | 10/2024 | Gan et al. | | |
| 2025/0016699 A1* | 1/2025 | Ma | ........................ | H04L 5/0053 |

FOREIGN PATENT DOCUMENTS

| | | | | |
|---|---|---|---|---|
| CN | 113115330 | | 7/2021 | |
| CN | 113422642 | | 9/2021 | |
| CN | 114204976 A | * | 3/2022 | ........... H04B 7/1851 |
| CN | 114362808 | | 4/2022 | |
| CN | 114362808 A | * | 4/2022 | |
| CN | 114650501 A | * | 6/2022 | ............. G01S 19/03 |
| CN | 114710784 A | * | 7/2022 | |
| CN | 114884537 | | 8/2022 | |
| CN | 114900805 | | 8/2022 | |
| CN | 114900805 A | * | 8/2022 | |
| CN | 115119317 | | 9/2022 | |
| CN | 117040578 | | 11/2023 | |
| EP | 4369632 | | 5/2024 | |
| KR | 20090029456 | | 3/2009 | |
| WO | 2015081552 | | 6/2015 | |
| WO | 2023011362 | | 2/2023 | |
| WO | 2023025075 | | 3/2023 | |
| WO | 2023103830 | | 6/2023 | |
| WO | WO-2023103830 A1 | * | 6/2023 | |

OTHER PUBLICATIONS

Chen Kangping et al., "Architecture and application prospect of LEO satellite data link," Journal of Navigation and Positioning, Date of issue: Aug. 31, 2023, vol. 11, No. 4, pp. 113-119 doi: 10.16547/j.cnki.10-1096.20230416 Full text Claims involved: 1-10.
Songyi Wang et al., "Design of Mobile Phone Back Clip for Field Emergency Communication Based on Beidou Short Message," 2023 5th International Conference on Electronic Engine and Informatics (EEI). Date of issue: Aug. 18, 2023, pp. 526-535. doi: 10.1109/EEI59236.2023.10212869 Full text.
Shulin Yan, "An Efficient Acquisition Strategy for Commercial Beidou-3 Dual-frequency Receivers," 2020 IEEE 5th International Conference on Signal and Image Processing (ICSIP). Date of issue: Feb. 4, 2021, pp. 833-837. doi: 10.1109/ICSIP49896.2020.9339377 Full text Claims involved: 1-10.
Retrieval report dated Dec. 25, 2023 in SIPO application No. 202311532875.1.
Notification to Grant Patent Right for Invention dated Jan. 6, 2024 in SIPO application No. 202311532875.1.

* cited by examiner

DRAWINGS

BEIDOU SHORT MESSAGE COMMUNICATION METHOD AND SYSTEM FOR LOW-POWER USER TERMINAL

CROSS-REFERENCE TO RELATED APPLICATIONS

This application claims priority to Chinese Patent Application No. 202311532875.1, filed on Nov. 17, 2023, the contents of which are hereby incorporated by reference.

TECHNICAL FIELD

The disclosure relates to the technical field of Beidou short messages, and in particular to a Beidou short message communication method and a system for a low-power user terminal.

BACKGROUND

Beidou short message communication system is mainly composed of a space segment, a ground control center and a user segment. The space segment is composed of a satellite constellation containing several satellites. These satellites (outbound transponders and inbound transponders) transmit the outbound signals sent by the ground central station and the inbound signals sent by the user machine, and have certain anti-interference ability. The ground control center completes the measurement and information receiving and transmitting of user signals, and manages and controls the operation of the whole system. The user segment receives data services and control messages from the ground control center, and transmits the data services and control messages into the station to eliminate information according to its own business requirements and outbound control signaling, so as to realize functions such as positioning, timing and short message communication.

Beidou-2 short message system requires the receiver to transmit power of 5 W-10 W, which makes most of the existing RDSS applications focus on ship-borne, vehicle-borne and ground-based fixed devices, and handheld applications are also special terminals with large volume and weight. The large size, high power consumption and high cost of terminal products have restricted the popularization of Beidou short messages to the public and the large-scale popularization and application of civil products. Beidou-3 short message is designed with a minimum transmission power of 2 W, but short message function module cannot be integrated into low-power Internet of Things and consumer mobile phones. Only by adopting a new service system may Beidou short message service win a place in the case of further rapid expansion of ground mobile communication network and rapid development of satellite communication service.

SUMMARY

Based on this, it is necessary to provide a Beidou short message communication method and a system for low-power user terminal for low-power Internet of Things and mobile phones.

The disclosure relates to a Beidou short message communication method for a low-power user terminal, and the method includes:

by a user terminal, receiving outbound signals broadcast by a central station and forwarded by a satellite transponder, determining a response beam according to the outbound signals, carrying out Doppler frequency compensation, and constructing a short message access frame with a fixed length for transmission; where the short message access frame includes a synchronous head and a user mark;

by the central station, receiving and parsing the short message access frame, obtaining user characteristic information, time information and spatial distance between the user terminal and the central station, carrying out a time-frequency resource block allocation according to the user characteristic information, the time information and the spatial distance, and transmitting time-frequency resource blocks to the user terminal;

by the user terminal, transmitting a short message communication frame with a fixed format to the central station according to the time-frequency resource blocks; where the short message communication frame includes the synchronous head and a data segment; and by a communication receiving device of the central station, receiving and sequentially carrying out sampling preprocessing, anti-interference processing, rapid capture and tracking demodulation on the short message communication frame to obtain communication service information, and pushing receipt information to the user terminal to complete an information push.

In an embodiment, by the user terminal receiving the outbound signals broadcast by the central station and forwarded by the satellite transponder, determining the response beam according to the outbound signals, carrying out the Doppler frequency compensation, and constructing the short message access frame with the fixed length for transmission, including:

by the central station, continuously broadcasting outbound signals and forwarding the outbound signals to the user terminal through the satellite transponder; and by the user terminal, determining the response beam according to the outbound signals, carrying out the Doppler frequency compensation to obtain compensation signals, carrying out a direct sequence spread spectrum modulation on the compensation signals, constructing the short message access frame with the fixed length, and randomly transmitting the short message access frame to the central station in a time division access mode.

In an embodiment, receiving and parsing the short message access frame, obtaining the user characteristic information, the time information and the spatial distance between the user terminal and the central station by the central station, including:

by the central station, capturing and roughly synchronizing the short message access frame according to the synchronous head in the short message access frame, parsing the short message access frame according to the user mark in the short message access frame, and obtaining the user characteristic information, the time information and the spatial distance between the user terminal and the central station; where the user characteristic information includes a user identity and a user type.

In an embodiment, carrying out the time-frequency resource block allocation according to the user characteristic information, the time information and the spatial distance, and transmitting the time-frequency resource blocks to the user terminal, including:

by the central station, dividing a time-domain and a frequency-domain of the Beidou short message into a plurality of the time-frequency resource blocks at fixed intervals, and for the time-domain, allocating corresponding time resource blocks to the user terminal according to the user characteristic information and the spatial distance between the user terminal and the central station;

for the frequency-domain, allocating corresponding frequency resource blocks to the user terminal according to the user characteristic information and the time information between the user terminal and the central station.

In an embodiment, by the user terminal, transmitting the short message communication frame with the fixed format to the central station according to the time-frequency resource blocks, including:

by the user terminal, transmitting the short message communication frame with the fixed format to the central station according to the time-frequency resource blocks, where the synchronous head in the short message communication frame is obtained by a spread spectrum modulation, and the data segment in the short message communication frame is obtained by coding.

In an embodiment, the data segment includes a frame tagging, a user address, an information segment, a check bit and a tail, where the user address, the information segment, the check bit and the tail are obtained by turbo coding with a code rate of 1/2.

In an embodiment, by the communication receiving device of the central station, receiving and sequentially carrying out the sampling preprocessing, the anti-interference processing, the rapid capture and the tracking demodulation on the short message communication frame to obtain the communication service information, including:

by the communication receiving device of the central station, receiving the short message communication frame and sequentially carrying out radio frequency processing, digital sampling, digital down conversion and filtering processing to convert the short message communication frame into digital baseband signals;

sequentially carrying out interference signal detection, parameter identification and interference suppression processing on the digital baseband signals, and outputting anti-interference digital baseband signals;

carrying out fast time-frequency-domain search on the anti-interference digital baseband signals to obtain time-domain information and frequency-domain information of the anti-interference digital baseband signals; and tracking carrier and code phase of the short message communication frame according to the time-domain information and the frequency-domain information, and carrying out demodulation processing on the data segment in the short message communication frame to obtain the communication service information.

A Beidou short message communication system for a low-power user terminal, where the system includes:

a user terminal, used for receiving outbound signals broadcast by a central station and forwarded by a satellite transponder, determining a response beam according to the outbound signals, carrying out Doppler frequency compensation, and constructing a short message access frame with a fixed length for transmission, where the short message access frame includes a synchronous head and a user mark; the short message communication frame with the fixed format is transmitted to the central station according to the time-frequency resource blocks, where the short message communication frame includes the synchronous head and a data segment; and a central station, used for receiving and parsing the short message access frame, obtaining user characteristic information, time information and spatial distance between the user terminal and the central station, carrying out a time-frequency resource block allocation according to the user characteristic information, the time information and the spatial distance, and transmitting time-frequency resource blocks to the user terminal; receiving and sequentially carrying out sampling preprocessing, anti-interference processing, rapid capture and tracking demodulation on the short message communication frame to obtain communication service information, and pushing receipt information to the user terminal to complete an information push by a communication receiving device.

In an embodiment, the user terminal includes:

a user-specific module, used for inputting user control information and frequency point control information to a baseband signal generating module and a radio frequency transmitting module according to user characteristics;

the baseband signal generating module, used for generating the short message access frame and the short message communication frame according to the user characteristics; and the radio frequency transmitting module, used for carrying out carrier modulation on the short message access frame and the short message communication frame and transmitting the short message access frame and the short message communication frame to the communication receiving device of the central station.

In an embodiment, the communication receiving device of the central station includes:

a sampling preprocessing module, used for receiving the short message communication frame and sequentially carrying out radio frequency processing, digital sampling, digital down conversion and filtering processing to convert the short message communication frame into digital baseband signals;

an anti-interference processing module, used for sequentially carrying out interference signal detection, parameter identification and interference suppression processing on the digital baseband signals, and outputting anti-interference digital baseband signals;

a fast capture module, used for carrying out fast time-frequency-domain search on the anti-interference digital baseband signals to obtain time-domain information and frequency-domain information of the anti-interference digital baseband signals; and a tracking demodulation module, used for tracking carrier and code phase of the short message communication frame according to the time-domain information and the frequency-domain information, and carrying out demodulation processing on the data segment in the short message communication frame to obtain the communication service information.

According to the Beidou short message communication method and a system for low-power user terminal, the user terminal receives outbound signals broadcast by a central station and forwarded by a satellite transponder, determines a response beam according to the outbound signals and carries out Doppler frequency compensation, and constructs a short message access frame with a fixed length for transmission, thereby realizing user access confirmation and allocation of time-frequency resource blocks, and providing communication conditions for subsequent short message communication frames; the central station receives and parses the short message access frame, obtains user characteristic information, time information and spatial distance between the user terminal and the central station, carries out a time-frequency resource block allocation according to the user characteristic information, the time information and the spatial distance, and transmits time-frequency resource blocks to the user terminal, so that different users are allocated to different time-frequency resource blocks, thereby effectively reducing multi-user multiple access interference and contributing to the improvement of system service performance; the user terminal transmits a short message communication frame with a fixed format to the central station according to the time-frequency resource blocks, thus realizing the information communication between the user terminal and the central station; a communication receiving device of the central station receives and sequentially carries out sampling preprocessing, anti-interference processing, rapid capture and tracking demodulation on the short message communication frame to obtain communication service information, and pushes receipt information to the user terminal to complete an information push. By adopting the method, low-power Internet of Things and mobile phone services are supported; by constructing Beidou short message access frame, Beidou short message communication frame structure and time-frequency resource block allocation, the access service quality of low-power user terminals may be effectively improved, satellite Internet of Things and mobile phone services may be supported, and the mass application market may be effectively developed.

DETAILED DESCRIPTION OF THE EMBODIMENTS

In order to make the objective, technical scheme and advantages of this application more clear, the application will be further described in detail with the attached drawings and embodiments. It should be understood that the specific embodiments described herein are only used to explain the application, and are not used to limit the application.

Figure 1:
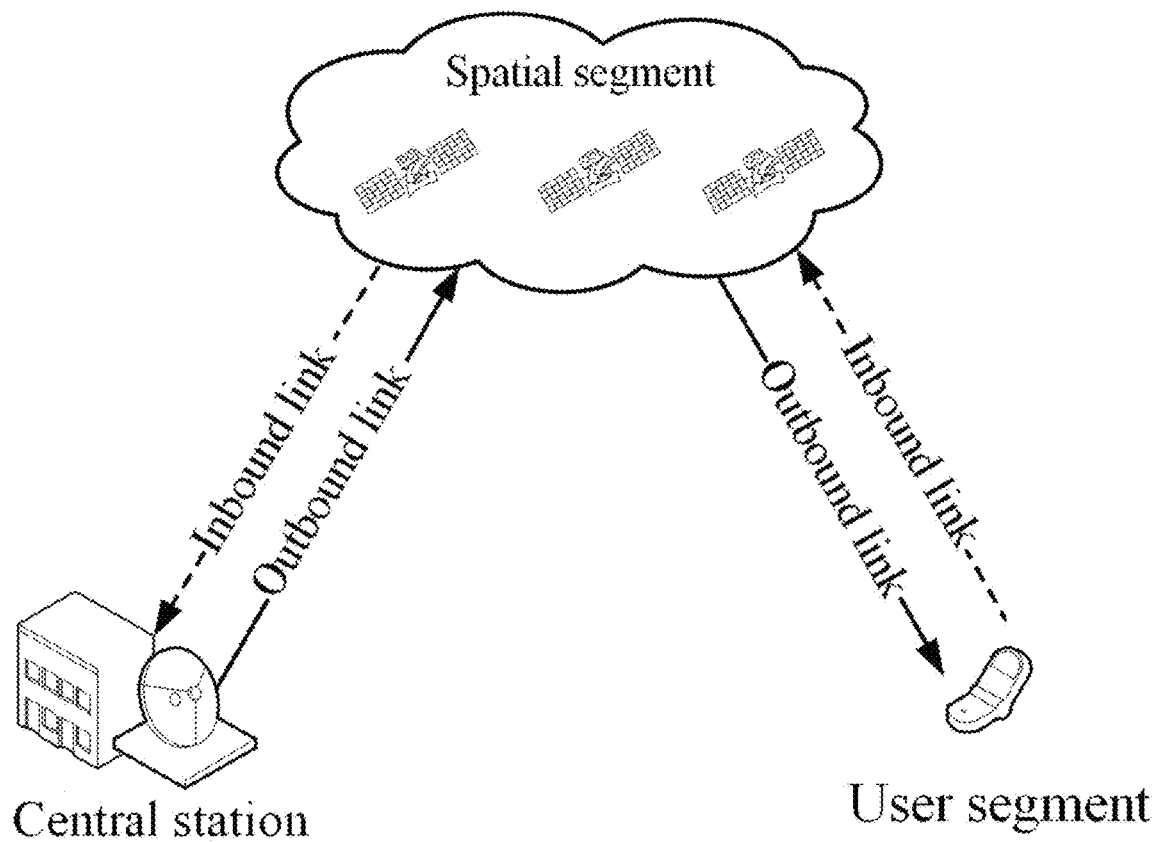
FIG. 1 is an application scenario diagram of Beidou short message communication method for a low-power user terminal in one embodiment.

A Beidou short message communication method for a low-power user terminal provided by this application may be applied to the application environment as shown in FIG. 1. Among them, the ground control center communicates with the user segment through a space segment composed of multiple satellites. The ground control center transmits the outbound signals to the space segment along the outbound link, transmits the outbound signals to the user segment through the space segment by forwarding to the outbound link, the user segment transmits the inbound signal to the space segment along the inbound link, and forwards the inbound signal to the ground control center through the space segment. Among them, the user segment may be but not limited to various personal computers, notebook computers, smart phones, tablet computers and portable wearable devices, and the ground control center may be realized by an independent server or a server cluster composed of multiple servers.

Figure 2:
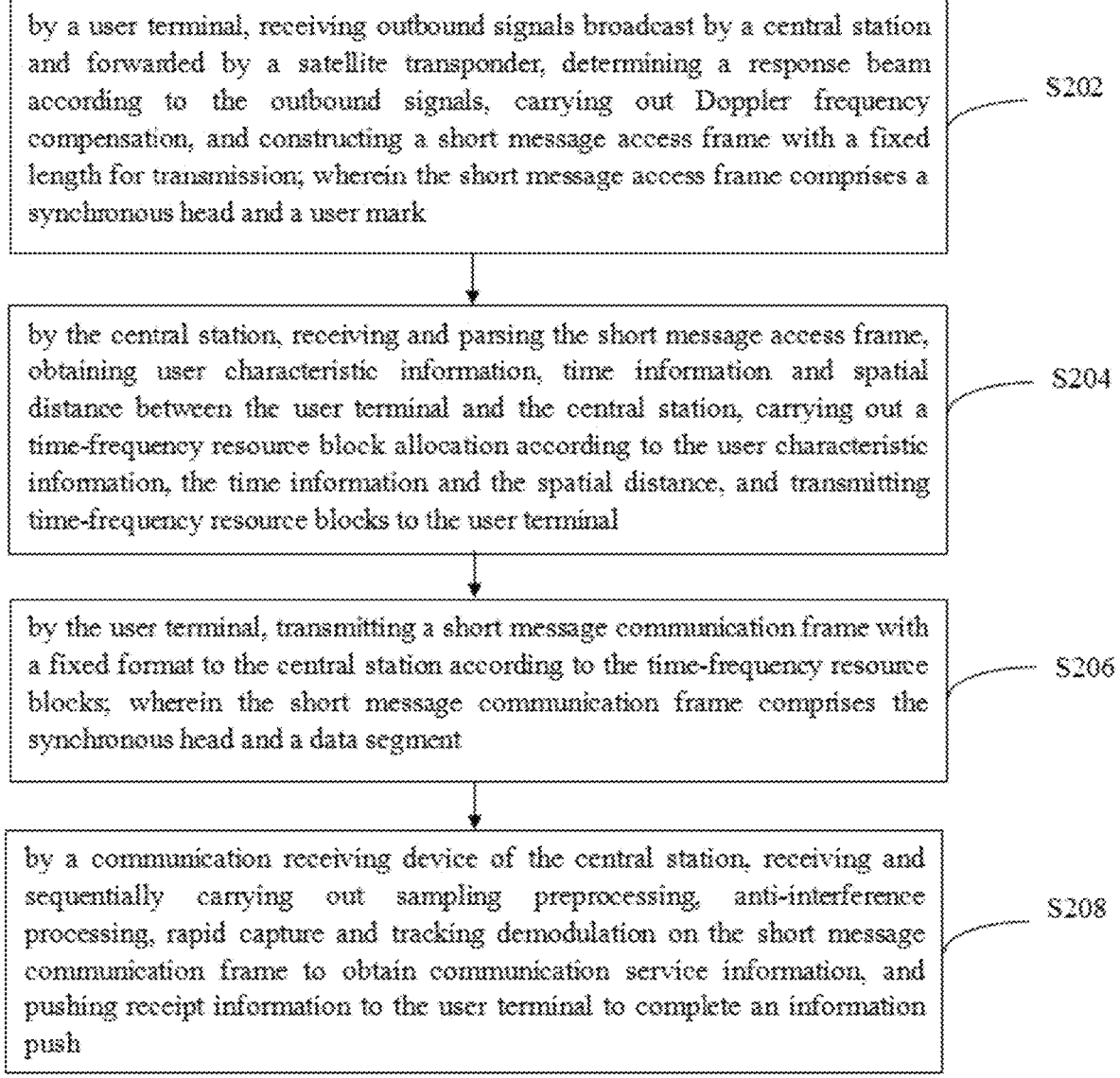
FIG. 2 is a flow diagram of a Beidou short message communication method for a low-power user terminal in one embodiment.

In one embodiment, as shown in FIG. 2, a Beidou short message communication method for a low-power user terminal is provided. Taking the application of this method in the application environment shown in FIG. 1 as an example, including the following steps:

Step 202, by a user terminal, receiving outbound signals broadcast by a central station and forwarded by a satellite transponder, determining a response beam according to the outbound signals, carrying out Doppler frequency compensation, and constructing a short message access frame with a fixed length for transmission; where the short message access frame includes a synchronous head and a user mark.

It can be understood that the short message access frame is mainly to realize the user's access confirmation and the allocation of time-frequency resource blocks, and provide communication conditions for subsequent short message communication frames, in which the synchronous head is used for capturing and coarse synchronization of the short message access frame, and the user mark is used for modulating the user identity information, which is convenient for identifying users.

Step 204, by the central station, receiving and parsing the short message access frame, obtaining user characteristic information, time information and spatial distance between the user terminal and the central station, carrying out a time-frequency resource block allocation according to the user characteristic information, the time information and the spatial distance, and transmitting time-frequency resource blocks to the user terminal.

It can be understood that the typical feature of the low-power user terminal is that there are a large number of users accessing at the same time. If all users access in the same frequency band, there are two problems: firstly, the multiple access interference will be very serious, and in order to effectively alleviate the multiple access interference, it is one of the effective measures to assign different users to different time-frequency resource blocks; secondly, because Beidou short message communication signals use the same access synchronous head, if the signals of different users arrive at the central station at the same time, there will be resource conflicts, which will lead to the failure of user communication. Assigning users who arrive at the central station in close time to different frequency resource blocks will help improve the service performance of the system.

Step 206, by the user terminal, transmitting a short message communication frame with a fixed format to the central station according to the time-frequency resource blocks; where the short message communication frame includes the synchronous head and a data segment.

It can be understood that the short message communication frame needs to include two parts to realize information communication. One part is the synchronous head, which is used to realize signal synchronization; the other part is the data segment, which is used to convey information.

Step 208, by a communication receiving device of the central station, receiving and sequentially carrying out sampling preprocessing, anti-interference processing, rapid capture and tracking demodulation on the short message communication frame to obtain communication service information, and pushing receipt information to the user terminal to complete an information push.

According to the Beidou short message communication method and a system for low-power user terminal, the user terminal receives outbound signals broadcast by a central station and forwarded by a satellite transponder, determines a response beam according to the outbound signals and carries out Doppler frequency compensation, and constructs a short message access frame with a fixed length for transmission, thereby realizing user access confirmation and allocation of time-frequency resource blocks, and providing communication conditions for subsequent short message communication frames; the central station receives and parses the short message access frame, obtains user characteristic information, time information and spatial distance between the user terminal and the central station, carries out a time-frequency resource block allocation according to the user characteristic information, the time information and the spatial distance, and transmits time-frequency resource blocks to the user terminal, so that different users are allocated to different time-frequency resource blocks, thereby effectively reducing multi-user multiple access interference and contributing to the improvement of system service performance; the user terminal transmits a short message communication frame with a fixed format to the central station according to the time-frequency resource blocks, thus realizing the information communication between the user terminal and the central station; a communication receiving device of the central station receives and sequentially carries out sampling preprocessing, anti-interference processing, rapid capture and tracking demodulation on the short message communication frame to obtain communication service information, and pushes receipt information to the user terminal to complete an information push. By adopting the method, low-power Internet of Things and mobile phone services are supported; by constructing Beidou short message access frame, Beidou short message communication frame structure and time-frequency resource block allocation, the access service quality of low-power user terminals may be effectively improved, satellite Internet of Things and mobile phone services may be supported, and the mass application market may be effectively developed.

In one embodiment, by a user terminal, receiving outbound signals broadcast by a central station and forwarded by a satellite transponder, determining a response beam according to the outbound signals, carrying out Doppler frequency compensation, and constructing a short message access frame with a fixed length for transmission, including:

by the central station, continuously broadcasting outbound signals and forwarding the outbound signals to the user terminal through the satellite transponder;

by the user terminal, determining the response beam according to the outbound signals, carrying out the Doppler frequency compensation to obtain compensation signals, carrying out a direct sequence spread spectrum modulation on the compensation signals, constructing the short message access frame with the fixed length, and randomly transmitting the short message access frame to the central station in a time division access mode.

Figure 3:
FIG. 3 is a frame structure diagram of a short message access frame in one embodiment.

It can be understood that the frame structure of the short message access frame is shown in FIG. 3, including a synchronous head and a user mark, where the synchronous head adopts spread spectrum modulation, and no information is modulated on the synchronous head, which may improve the sensitivity of the synchronous head in capturing and coarse synchronization of the short message access frame; the user identity information is modulated on the user mark to identify the user. In order to occupy the system resources to the minimum, the short message access frame needs to realize the access confirmation of the system in the shortest time, and the information that must be carried is the user identity information. In addition, when constructing short message access frames, direct sequence spread spectrum modulation is adopted and access frames are randomly transmitted by time division access, so that multi-user signals may be accessed on the same frequency in a preemptive manner, and the signal access efficiency is improved.

In one embodiment, by the central station, receiving and parsing the short message access frame, obtaining the user characteristic information, the time information and the spatial distance between the user terminal and the central station, including:

by the central station, capturing and roughly synchronizing the short message access frame according to the synchronous head in the short message access frame, parsing the short message access frame according to the user mark in the short message access frame, and obtaining the user characteristic information, the time information and the spatial distance between the user terminal and the central station; where the user characteristic information includes a user identity and a user type.

It can be understood that the central station may activate the corresponding user terminal through the received short message access frame, and use the user-related information according to the synchronous head and user mark in the short message access frame.

In one embodiment, carrying out the time-frequency resource block allocation according to the user characteristic information, the time information and the spatial distance, and transmitting the time-frequency resource blocks to the user terminal, including:

by the central station, dividing a time-domain and a frequency-domain of the Beidou short message into a plurality of the time-frequency resource blocks at fixed intervals, and for the time-domain, allocating corresponding time resource blocks to the user terminal according to the user characteristic information and the spatial distance between the user terminal and the central station; and for the frequency-domain, allocating corresponding frequency resource blocks to the user terminal according to the user characteristic information and the time information between the user terminal and the central station.

Figure 4:
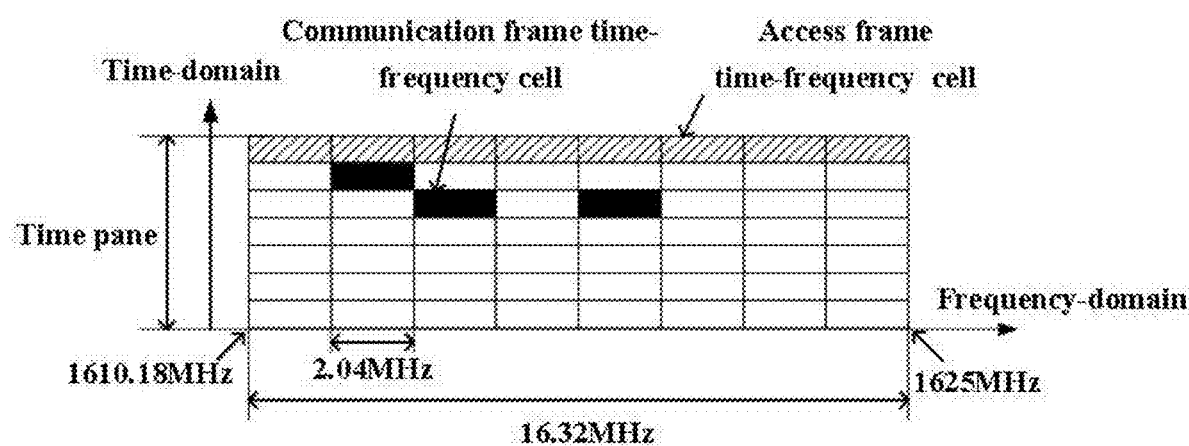
FIG. 4 is a flowchart of a time-frequency resource allocation method in one embodiment.

Specifically, the time-frequency resource block allocation method is shown in FIG. 4. The central station divides the time-domain and frequency-domain of Beidou short message into multiple time-frequency resource blocks at fixed intervals.

For the time-domain, according to the user characteristic information and the spatial distance between the user terminal and the central station, the corresponding time resource block is allocated to the user, and the user may obtain his own transmission time by subtracting the user spatial distance from the allocated time resource blocks. Because the period of the outbound signal frame of Beidou short message is 31.25 ms, the time resource blocks may be partitioned according to an outbound frame of 31.25 ms.

For the frequency-domain, the 16.32 MHz frequency bandwidth of Beidou short message is divided into several frequency resource blocks, and the central station inquires about the idle situation of the resource blocks according to the user characteristic information and the time information between the user terminal and the central station, and allocates the resource blocks of different users. It can be understood that the division of frequency resource blocks needs to consider the complexity of system implementation and the channel adaptability of user communication frame signals. For short message access frames, all users use the same frequency resources for access, and the short message access frames are required to have high-precision ranging ability. Therefore, the whole frequency resource block may be occupied. As shown in FIG. 4, the frequency-domain is divided into 8 resource blocks according to a resource block of 2.04 MHz, and all 8 resource blocks are allocated for short message access frames. For short message communication frames, different users use different frequency resource blocks to allocate different users to different frequency resource blocks, so the resource blocks should be as small as possible, and the bandwidth of each resource block should not be too small for better satellite communication channel adaptability, so for short message communication frames, one resource block should be allocated.

In one embodiment, by the user terminal, transmitting the short message communication frame with the fixed format to the central station according to the time-frequency resource blocks, including:

by the user terminal, transmitting the short message communication frame with the fixed format to the central station according to the time-frequency resource blocks, where the synchronous head in the short message communication frame is obtained by a spread spectrum modulation, and the data segment in the short message communication frame is obtained by coding.

Figure 5:
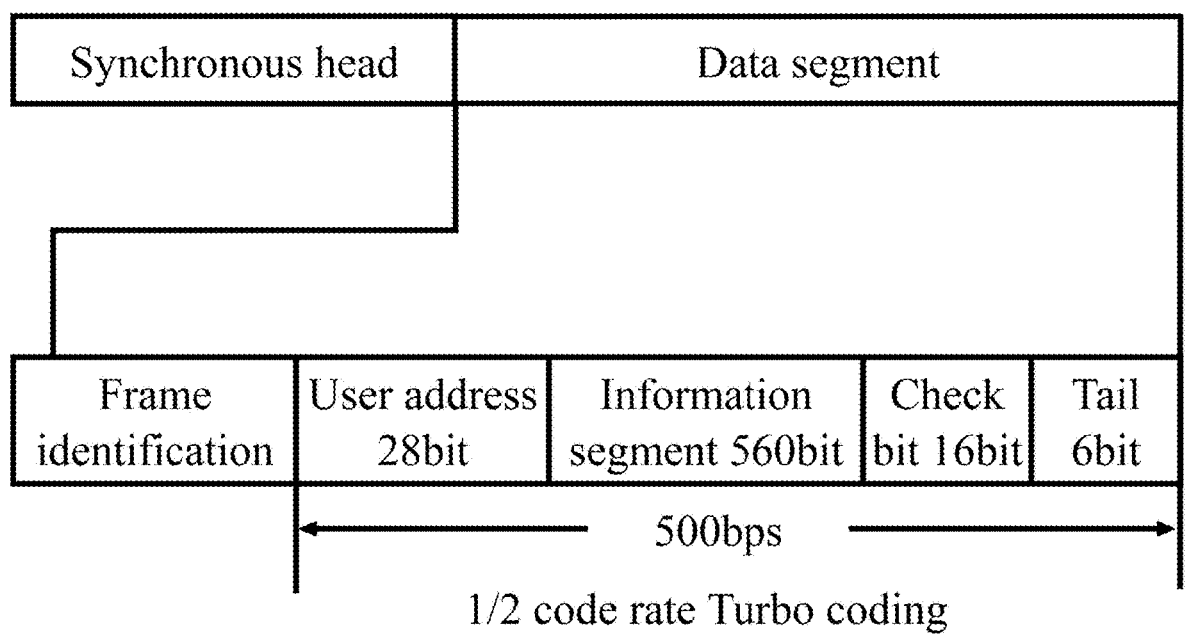
FIG. 5 is a frame structure diagram of a short message communication frame in one embodiment.

Specifically, the frame structure of the short message communication frame is shown in FIG. 5, and the data segment includes a frame tagging, a user address of 28 bits, an information segment of 560 bits, a check bit (Cyclic redundancy check) of 16 bits and a tail of 6 bit, where the user address, the information segment, the check bit and the tail are obtained by turbo coding with a code rate of 1/2.

It can be understood that the synchronous head of short message communication frame is also obtained by spread spectrum modulation, and no information is modulated on the synchronous head, so that the sensitivity of capturing and coarse synchronization may be improved and signal synchronization may be realized. The data segment is used to realize information transmission. Specifically, because the minimum transmission power of Beidou-3 short message is 2 w and the information rate is 2 kbps, in order to reduce the minimum transmission power of users from 2 w of Beidou-3 to 0.5 w (antenna gain-3 dBi), the information rate is reduced to 500 bps for the data segment, and for compatibility with Beidou-3 short message, the Turbo coding system with 1/2 code rate is still adopted. Meanwhile, in order to expand the user service, the user address is expanded from 24 bit to 28 bit.

Figure 6:
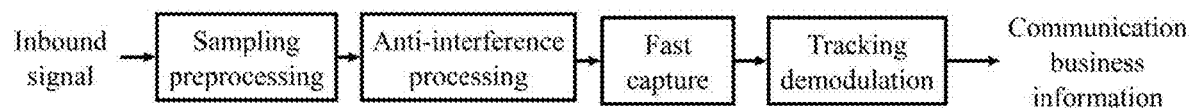
FIG. 6 is a schematic diagram of the receiving processing flow of the communication receiving device in one embodiment.

In one embodiment, the receiving processing flow of the communication receiving device of the central station is shown in FIG. 6, receiving and sequentially carrying out the sampling preprocessing, the anti-interference processing, the rapid capture and the tracking demodulation on the short message communication frame to obtain the communication service information by the communication receiving device of the central station, including:

by the communication receiving device of the central station, receiving the short message communication frame and sequentially carrying out radio frequency processing, digital sampling, digital down conversion and filtering processing to convert the short message communication frame into digital baseband signals;

sequentially carrying out interference signal detection, parameter identification and interference suppression processing on the digital baseband signals, and outputting anti-interference digital baseband signals;

carrying out fast time-frequency-domain search on the anti-interference digital baseband signals to obtain time-domain information and frequency-domain information of the anti-interference digital baseband signals; and tracking carrier and code phase of the short message communication frame according to the time-domain information and the frequency-domain information, and carrying out demodulation processing on the data segment in the short message communication frame to obtain the communication service information.

Figure 7:
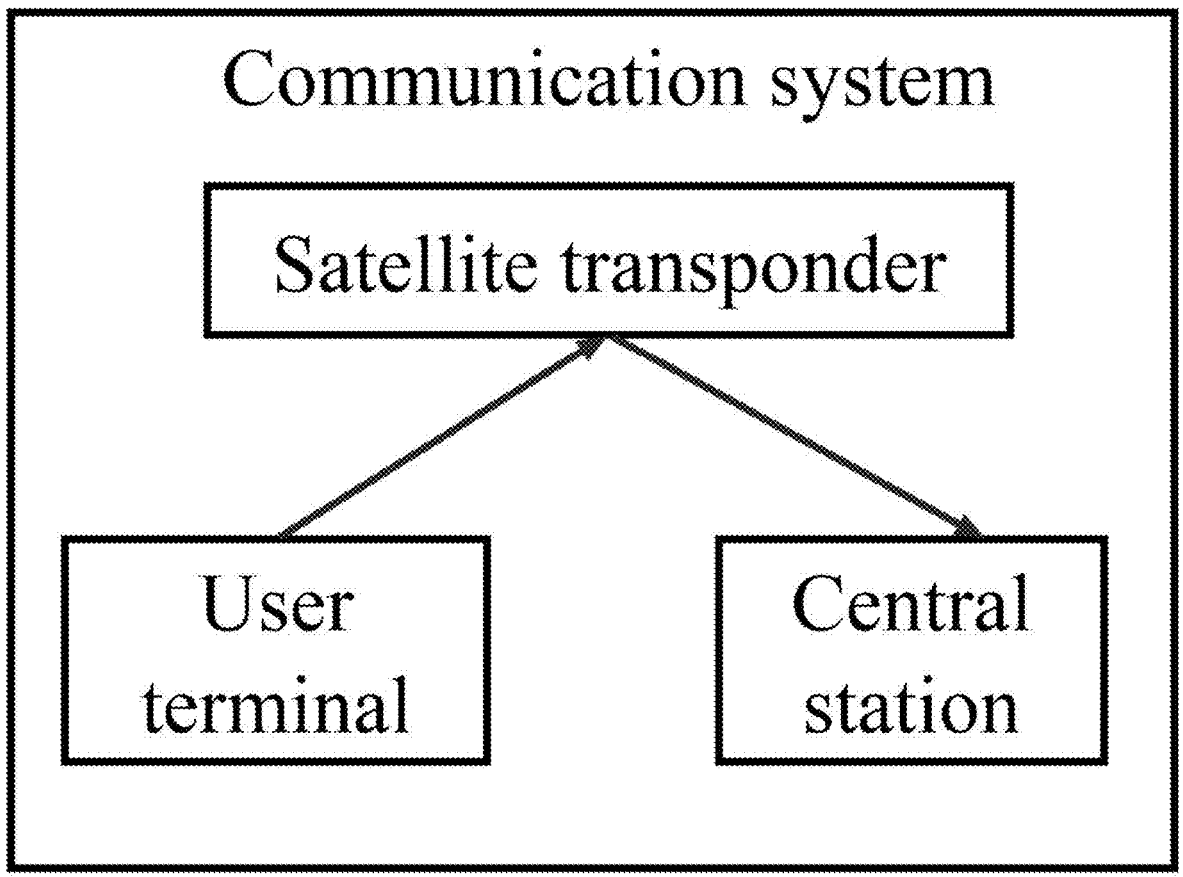
FIG. 7 is a structural frame diagram of Beidou short message communication system for a low-power user terminal in one embodiment.

In one embodiment, as shown in FIG. 7, a Beidou short message communication system for a low-power user terminal is provided, which includes a user terminal, a central station and a satellite transponder, where:

a user terminal, used for receiving outbound signals broadcast by a central station and forwarded by a satellite transponder, determining a response beam according to the outbound signals, carrying out Doppler frequency compensation, and constructing a short message access frame with a fixed length for transmission; where, the short message access frame includes a synchronous head and a user mark; the short message communication frame with the fixed format is transmitted to the central station according to the time-frequency resource blocks; where the short message communication frame includes the synchronous head and a data segment; and a central station, used for receiving and parsing the short message access frame, obtaining user characteristic information, time information and spatial distance between the user terminal and the central station, carrying out a time-frequency resource block allocation according to the user characteristic information, the time information and the spatial distance, and transmitting time-frequency resource blocks to the user terminal; by a communication receiving device, receiving and sequentially carrying out sampling preprocessing, anti-interference processing, rapid capture and tracking demodulation on the short message communication frame to obtain communication service information, and pushing receipt information to the user terminal to complete an information push.

Figure 8:
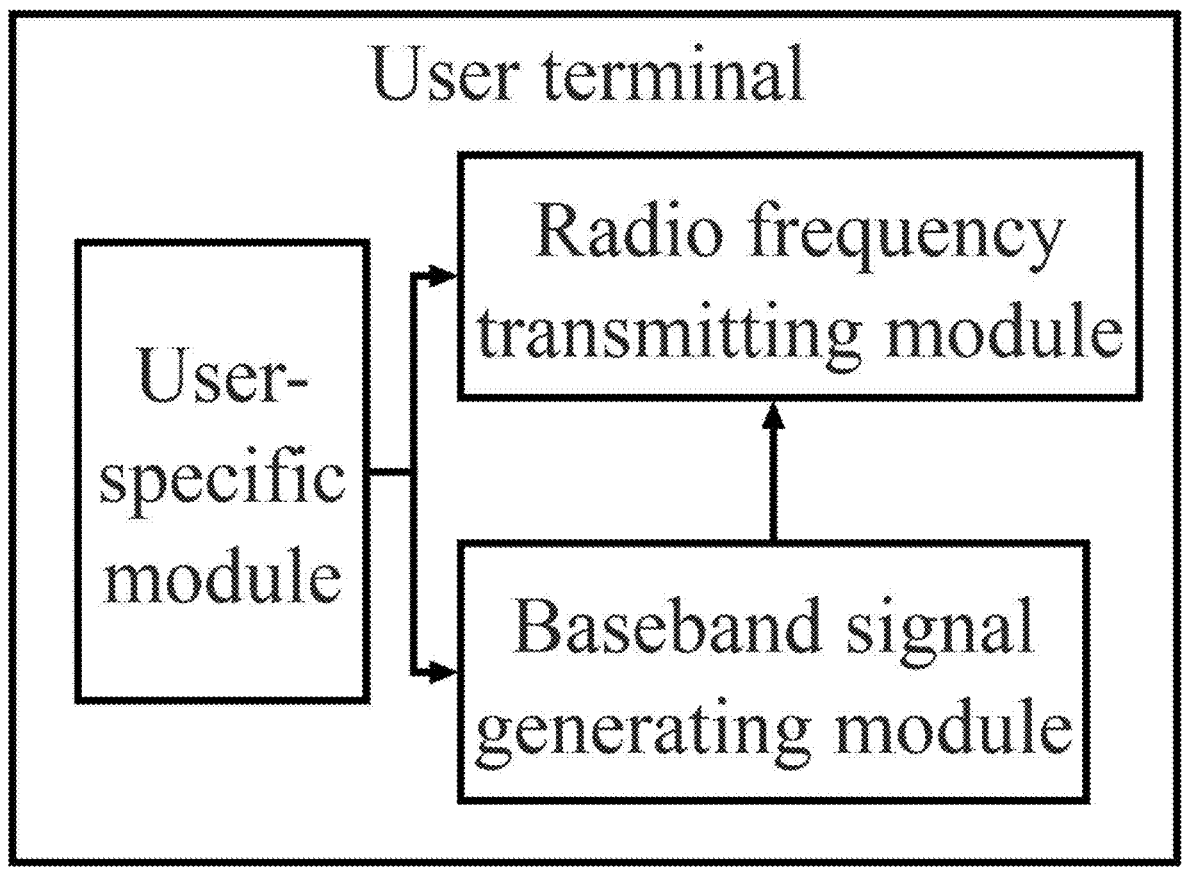
FIG. 8 is a schematic structural diagram of a user terminal in one embodiment.

In one embodiment, the principle structure of the user terminal is shown in FIG. 8, including:

a user-specific module, used for inputting user control information and frequency point control information to a baseband signal generating module and a radio frequency transmitting module according to user characteristics;

the baseband signal generating module, used for generating the short message access frame and the short message communication frame according to the user characteristics; and the radio frequency transmitting module, used for carrying out carrier modulation on the short message access frame and the short message communication frame and transmitting the short message access frame and the short message communication frame to the communication receiving device of the central station.

Figure 9:
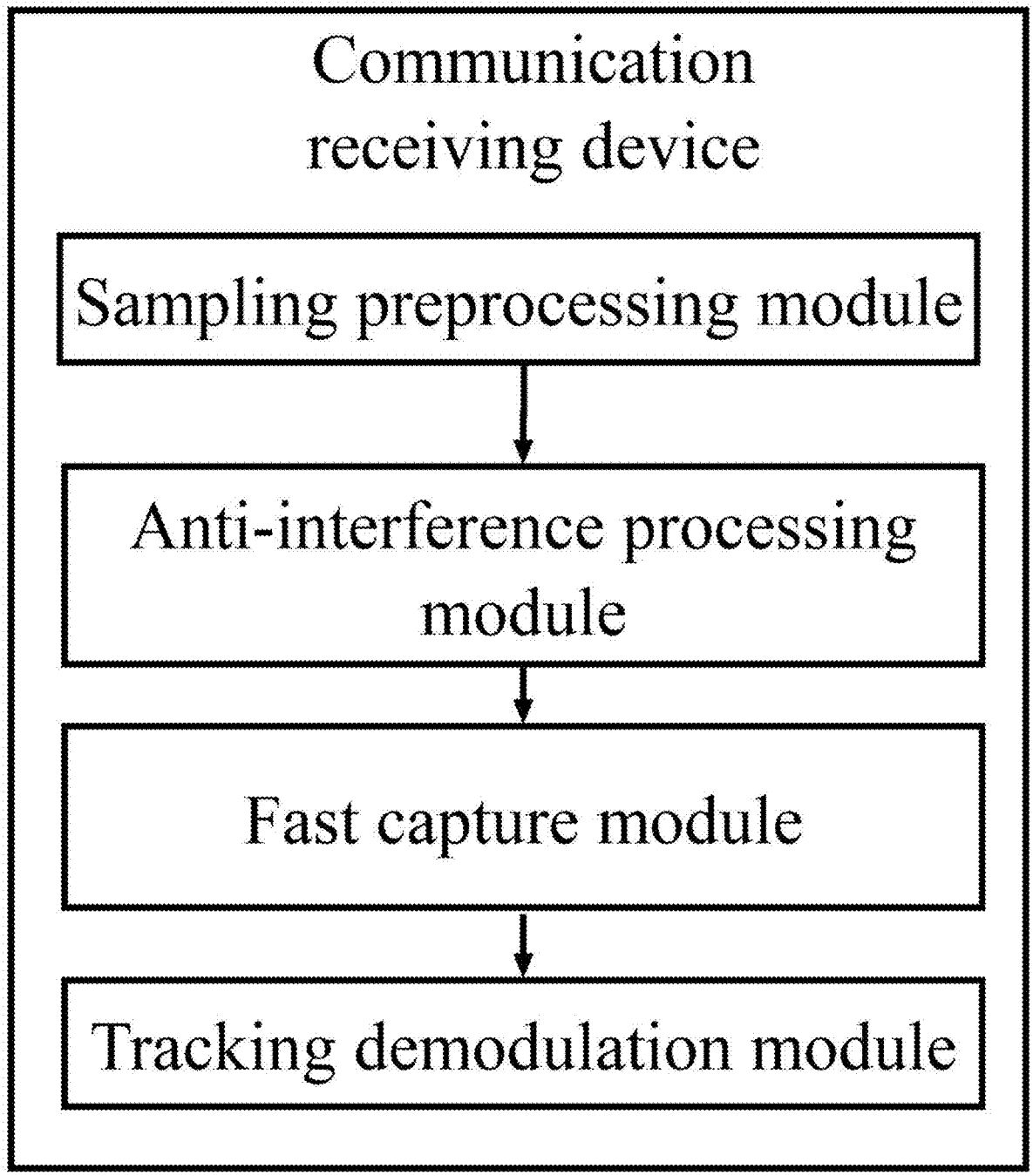
FIG. 9 is a schematic structural diagram of a communication receiving device in one embodiment.

In one embodiment, the structure of the communication receiving device in the central station is as shown in FIG. 9, including:

a sampling preprocessing module, used for receiving the short message communication frame and sequentially carrying out radio frequency processing, digital sampling, digital down conversion and filtering processing to convert the short message communication frame into digital baseband signals;

an anti-interference processing module, used for sequentially carrying out interference signal detection, parameter identification and interference suppression processing on the digital baseband signals, and outputting anti-interference digital baseband signals;

a fast capture module, used for carrying out fast time-frequency-domain search on the anti-interference digital baseband signals to obtain time-domain information and frequency-domain information of the anti-interference digital baseband signals; and a tracking demodulation module, used for tracking carrier and code phase of the short message communication frame according to the time-domain information and the frequency-domain information, and carrying out demodulation processing on the data segment in the short message communication frame to obtain the communication service information.

For the specific definition of Beidou short message communication system for a low-power user terminal, please refer to the definition of Beidou short message communication method for a low-power user terminal above, and will not be repeated here. Each module in the Beidou short message communication system for a low-power user terminal may be realized in whole or in part by software, hardware and the combinations. The above modules may be embedded in or independent of the processor in the computer equipment in the form of hardware, and may also be stored in the memory in the computer equipment in the form of software, so that the processor may call and execute the operations corresponding to the above modules.

In one embodiment, according to a Beidou short message communication method and a system for a low-power user terminal provided by the present disclosure, low-power Internet of Things and mobile phone services are added on the basis of Beidou short message communication and location reporting services to meet the use requirements of users.

Figure 10:
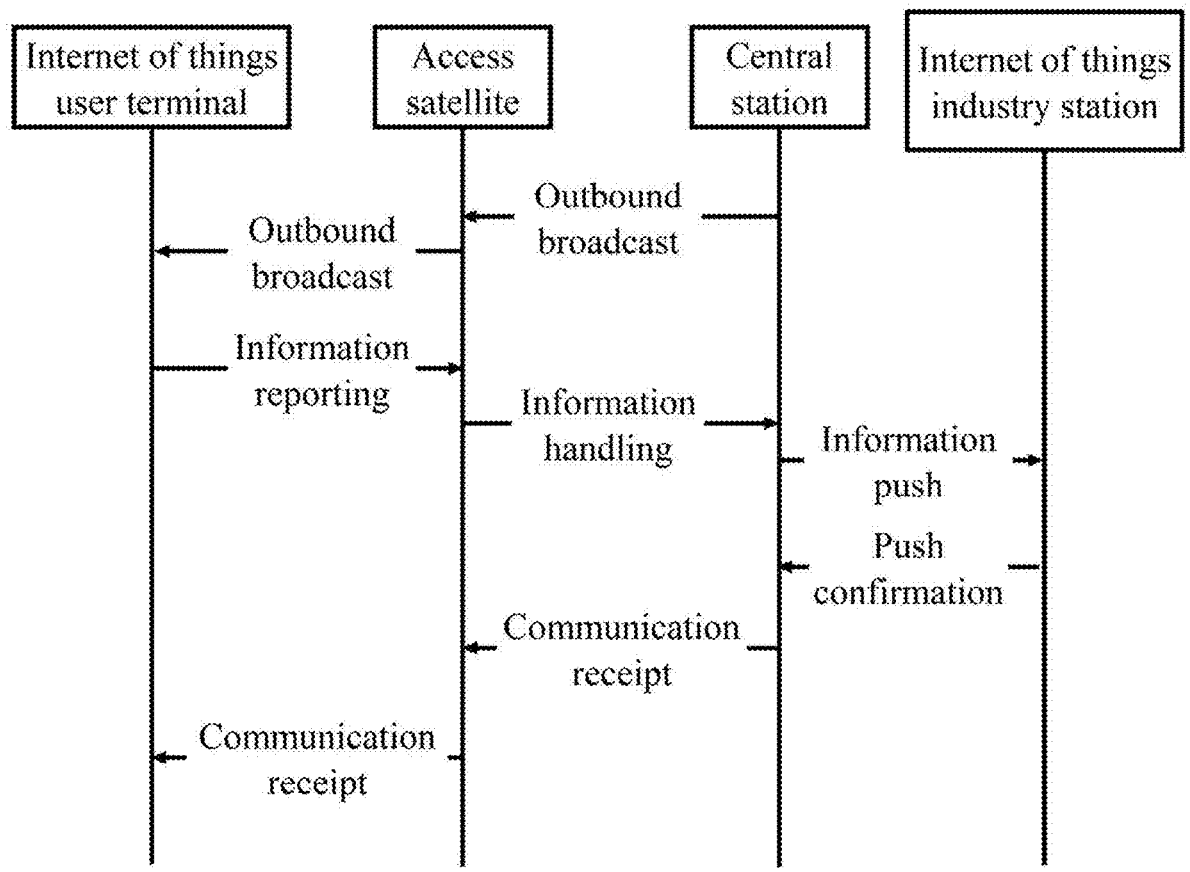
FIG. 10 is a schematic diagram of the communication service flow of the Internet of Things low-power consumption service in one embodiment.

Among them, for the low-power service of the Internet of Things, the specific business process is shown in FIG. 10, including:

the central station continuously broadcasts outbound signals and forwards the outbound signals to the user terminal of the Internet of Things via satellite; the user terminal of the Internet of Things receives the outbound signals, determines the response beam number, and compensates the Doppler frequency; the user terminal of the Internet of Things transmits an inbound signal, which is transparently forwarded to the central station via the satellite; the central station receives the signal, forwards the information to the corresponding lower-level industry processing center after processing, and pushes the receipt information to the user terminal of the Internet of Things; the lower-level industry processing center carries out corresponding Internet of Things information processing.

Figure 11:
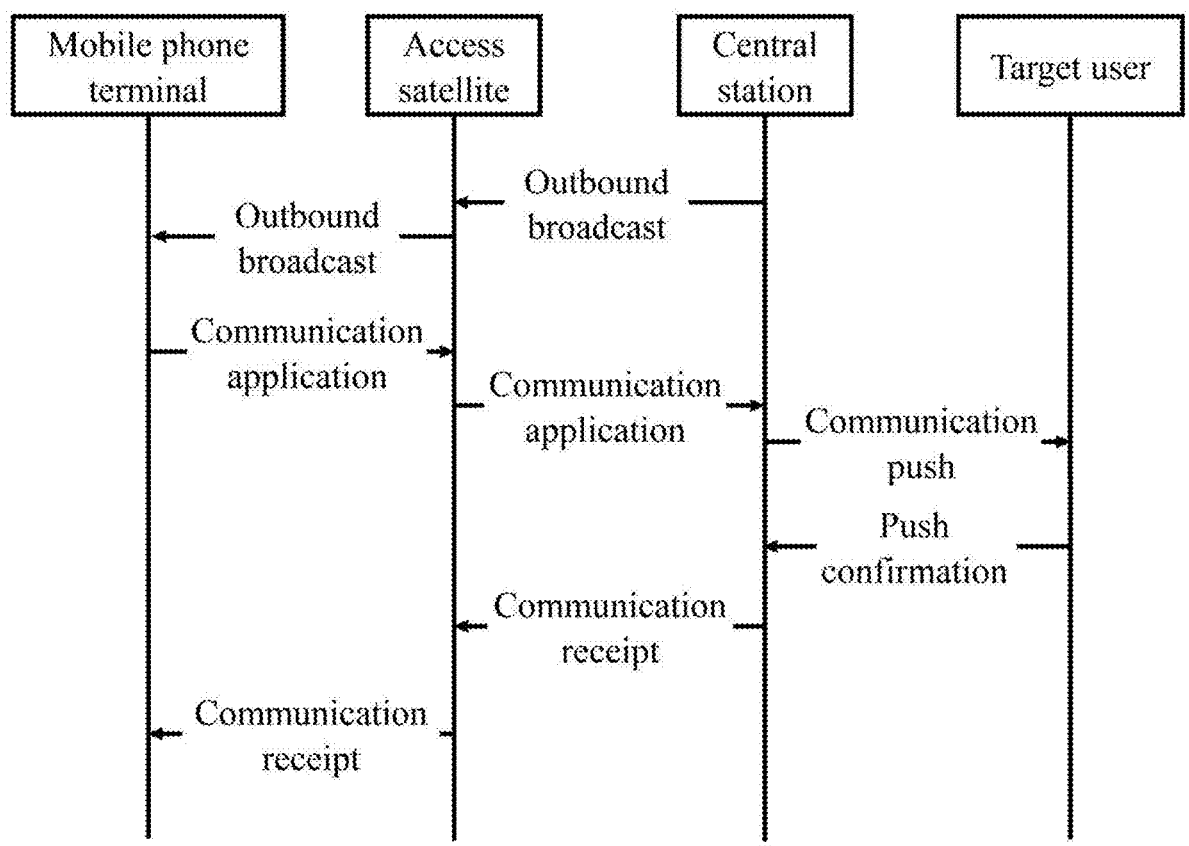
FIG. 11 is a schematic diagram of the communication service flow of a low-power service of mobile phones in one embodiment.

For low-power services of mobile phone, the specific business process is shown in FIG. 11, including:

the central station continuously broadcasts outbound signals and forwards the outbound signals to the mobile phone terminal via satellite; the mobile phone terminal receives the outbound signals, determines the response beam number and compensates the Doppler frequency; the mobile phone terminal transmits the inbound signal and transparently forwards the inbound signal to the central station via the satellite; the central station receives the signal and forwards the information to the target user after processing; after the target user receives the information successfully, the target user pushes the confirmation message to the central station; and the central station forwards the confirmation message to the mobile phone user.

Figure 12:
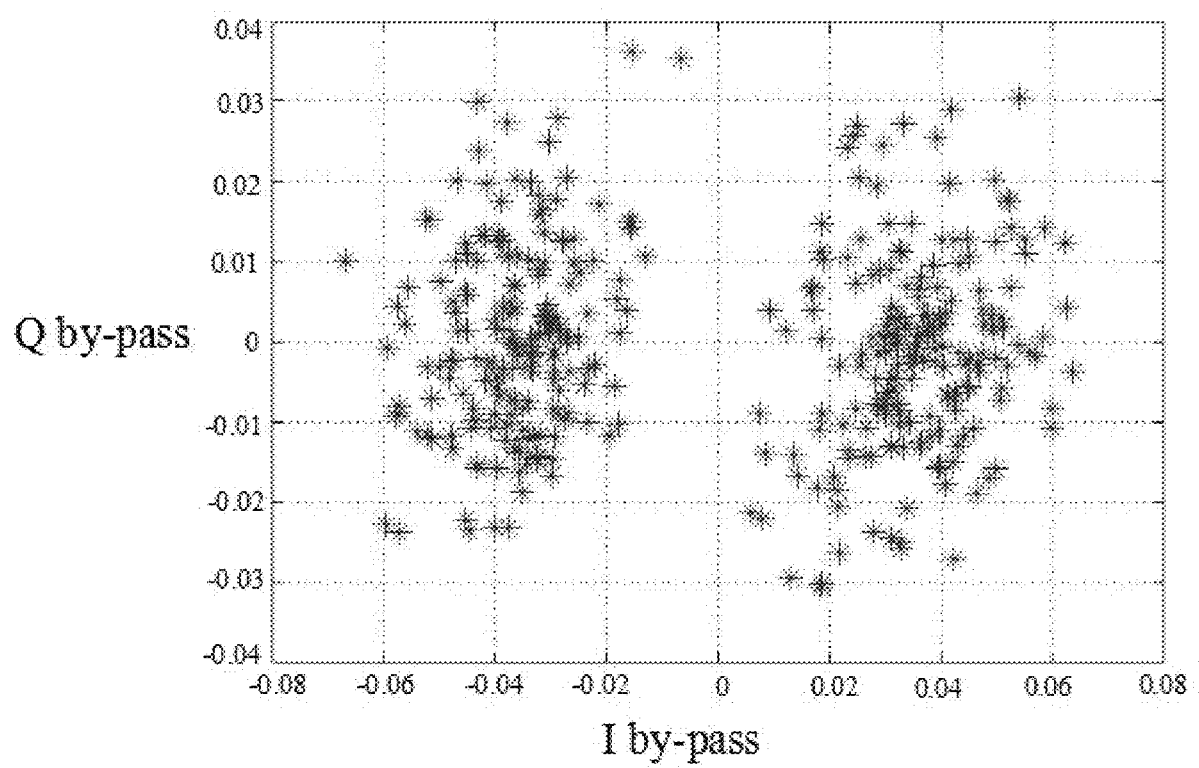
FIG. 12 is a constellation diagram of receive communication in one embodiment.

In a specific embodiment, the disclosure has also been verified by experiments. FIG. 12 is a constellation rate diagram received by the central station under the condition that the user machine adopts a 1 w power amplifier and the antenna gain is −6 dBi (the chip may be embedded in the mobile phone under the power consumption condition of the user machine), in which a frequency point is randomly selected to transmit signals in the simulation, the signal bandwidth is 2.04 MHz, the user's information transmission rate is 500 bps, and the coding gain is 6 dB. As can be seen from FIG. 12, the constellation may be distinguished, and the receiving performance is good, which meets the communication quality requirements of ordinary short message services.

The technical features of the above embodiments may be combined at will. In order to make the description concise, not all possible combinations of the technical features in the above embodiments are described. However, as long as there is no contradiction between the combinations of these technical features, they should be considered as the scope recorded in this specification.

The above-mentioned embodiments only express several implementations of the present application, and their descriptions are more specific and detailed, but they cannot be understood as limiting the scope of disclosure patents. It should be pointed out that for those skilled in the art, without departing from the concept of this application, several modifications and improvements may be made, which are within the protection scope of this application. Therefore, the scope of protection of the patent in this application shall be subject to the appended claims.

What is claimed is:

1. A Beidou short message communication method for a low-power user terminal, wherein the method comprises:

by a user terminal, receiving outbound signals broadcast by a central station and forwarded by a satellite transponder, determining a response beam according to the outbound signals, carrying out Doppler frequency compensation, and constructing a short message access frame with a fixed length for transmission; wherein the short message access frame comprises a synchronous head and a user mark;

by the central station, receiving and parsing the short message access frame, obtaining user characteristic information, time information and spatial distance between the user terminal and the central station, carrying out a time-frequency resource block allocation according to the user characteristic information, the time information and the spatial distance, and transmitting time-frequency resource blocks to the user terminal;

by the user terminal, transmitting a short message communication frame with a fixed format to the central station according to the time-frequency resource blocks; wherein the short message communication frame comprises the synchronous head and a data segment; and by a communication receiving device of the central station, receiving and sequentially carrying out sampling preprocessing, anti-interference processing, rapid capture and tracking demodulation on the short message communication frame to obtain communication service information, and pushing receipt information to the user terminal to complete an information push.

2. The method according to claim 1, wherein by the user terminal, receiving the outbound signals broadcast by the central station and forwarded by the satellite transponder, determining the response beam according to the outbound signals, carrying out the Doppler frequency compensation, and constructing the short message access frame with the fixed length for transmission, comprising:

by the central station, continuously broadcasting outbound signals and forwarding the outbound signals to the user terminal through the satellite transponder;

by the user terminal, determining the response beam according to the outbound signals, carrying out the Doppler frequency compensation to obtain compensation signals, carrying out a direct sequence spread spectrum modulation on the compensation signals, constructing the short message access frame with the fixed length, and randomly transmitting the short message access frame to the central station in a time division access mode.

3. The method according to claim 1, wherein by the central station, receiving and parsing the short message access frame, obtaining the user characteristic information, the time information and the spatial distance between the user terminal and the central station, comprising:

by the central station, capturing and roughly synchronizing the short message access frame according to the synchronous head in the short message access frame, parsing the short message access frame according to the user mark in the short message access frame, and obtaining the user characteristic information, the time information and the spatial distance between the user terminal and the central station; wherein the user characteristic information comprises a user identity and a user type.

4. The method according to claim 1, wherein carrying out the time-frequency resource block allocation according to the user characteristic information, the time information and the spatial distance, and transmitting the time-frequency resource blocks to the user terminal, comprising:

by the central station, dividing a time-domain and a frequency-domain of the Beidou short message into a plurality of the time-frequency resource blocks at fixed intervals, and for the time-domain, allocating corresponding time resource blocks to the user terminal according to the user characteristic information and the spatial distance between the user terminal and the central station; and for the frequency-domain, allocating corresponding frequency resource blocks to the user terminal according to the user characteristic information and the time information between the user terminal and the central station.

5. The method according to claim 1, wherein by the user terminal, transmitting the short message communication frame with the fixed format to the central station according to the time-frequency resource blocks, comprising:

by the user terminal, transmitting the short message communication frame with the fixed format to the central station according to the time-frequency resource blocks, wherein the synchronous head in the short message communication frame is obtained by a spread spectrum modulation, and the data segment in the short message communication frame is obtained by coding.

6. The method according to claim 1, wherein the data segment comprises a frame tagging, a user address, an information segment, a check bit and a tail, wherein the user address, the information segment, the check bit and the tail are obtained by turbo coding with a code rate of 1/2.

7. The method according to claim 1, wherein by the communication receiving device of the central station, receiving and sequentially carrying out the sampling preprocessing, the anti-interference processing, the rapid capture and the tracking demodulation on the short message communication frame to obtain the communication service information, comprising:

by the communication receiving device of the central station, receiving the short message communication frame and sequentially carrying out radio frequency processing, digital sampling, digital down conversion and filtering processing to convert the short message communication frame into digital baseband signals;

sequentially carrying out interference signal detection, parameter identification and interference suppression processing on the digital baseband signals, and outputting anti-interference digital baseband signals;

carrying out fast time-frequency-domain search on the anti-interference digital baseband signals to obtain time-domain information and frequency-domain information of the anti-interference digital baseband signals; and tracking carrier and code phase of the short message communication frame according to the time-domain information and the frequency-domain information, and carrying out demodulation processing on the data segment in the short message communication frame to obtain the communication service information.

8. A Beidou short message communication system for a low-power user terminal, comprising:

a user terminal, used for receiving outbound signals broadcast by a central station and forwarded by a satellite transponder, determining a response beam according to the outbound signals, carrying out Doppler frequency compensation, and constructing a short message access frame with a fixed length for transmission; wherein, the short message access frame comprises a synchronous head and a user mark; and transmitting a short message communication frame with a fixed format to the central station according to time-frequency resource blocks; wherein the short message communication frame comprises the synchronous head and a data segment; and a central station, used for receiving and parsing the short message access frame, obtaining user characteristic information, time information and spatial distance between the user terminal and the central station, carrying out a time-frequency resource block allocation according to the user characteristic information, the time information and the spatial distance, and transmitting time-frequency resource blocks to the user terminal; by a communication receiving device, receiving and sequentially carrying out sampling preprocessing, anti-interference processing, rapid capture and tracking demodulation on the short message communication frame to obtain communication service information, and pushing receipt information to the user terminal to complete an information push.

9. The system according to claim 8, wherein the user terminal comprises:

a user-specific module, used for inputting user control information and frequency point control information to a baseband signal generating module and a radio frequency transmitting module according to user characteristics;

the baseband signal generating module, used for generating the short message access frame and the short message communication frame according to the user characteristics; and the radio frequency transmitting module, used for carrying out carrier modulation on the short message access frame and the short message communication frame and transmitting to the communication receiving device of the central station.

10. The system according to claim 8, wherein the communication receiving device of the central station comprises:

a sampling preprocessing module, used for receiving the short message communication frame and sequentially carrying out radio frequency processing, digital sampling, digital down conversion and filtering processing to convert the short message communication frame into digital baseband signals;

an anti-interference processing module, used for sequentially carrying out interference signal detection, parameter identification and interference suppression processing on the digital baseband signals, and outputting anti-interference digital baseband signals;

a fast capture module, used for carrying out fast time-frequency-domain search on the anti-interference digital baseband signals to obtain time-domain information and frequency-domain information of the anti-interference digital baseband signals; and a tracking demodulation module, used for tracking carrier and code phase of the short message communication frame according to the time-domain information and the frequency-domain information, and carrying out demodulation processing on the data segment in the short message communication frame to obtain the communication service information.

\* \* \* \* \*